(12) United States Patent
Pepper

(10) Patent No.: US 11,543,137 B2
(45) Date of Patent: Jan. 3, 2023

(54) SYSTEMS AND METHODS FOR A REVERSE THERMOSTAT

(71) Applicant: Douglas Pepper, Tucson, AZ (US)

(72) Inventor: Douglas Pepper, Tucson, AZ (US)

(*) Notice: Subject to any disclaimer, the term of this patent is extended or adjusted under 35 U.S.C. 154(b) by 660 days.

(21) Appl. No.: 16/549,795

(22) Filed: Aug. 23, 2019

(65) Prior Publication Data

US 2020/0063982 A1 Feb. 27, 2020

Related U.S. Application Data

(60) Provisional application No. 62/721,875, filed on Aug. 23, 2018.

(51) Int. Cl.
| | | |
|---|---|---|
| *F24D 19/10* | (2006.01) | |
| *G05D 23/13* | (2006.01) | |
| *E03C 1/04* | (2006.01) | |
| *G01K 13/02* | (2021.01) | |

(52) U.S. Cl.
CPC ..... *F24D 19/1069* (2013.01); *G05D 23/1333* (2013.01); *E03C 2001/0418* (2013.01); *G01K 13/026* (2021.01)

(58) Field of Classification Search
CPC ............ F24D 19/1069; G05D 23/1333; G05D 23/02; G05D 23/021; G05D 23/022; G01K 13/026; E03C 2001/0418
See application file for complete search history.

(56) References Cited

U.S. PATENT DOCUMENTS

| | | | | |
|---|---|---|---|---|
| 3,263,926 | A * | 8/1966 | Couffer | E03C 1/041 236/93 B |
| 4,281,790 | A * | 8/1981 | McGinnis | G05D 23/02 236/93 B |
| 6,243,891 | B1* | 6/2001 | Nickerson | F16K 31/002 4/597 |
| 2010/0175183 | A1* | 7/2010 | Cannon | E03C 1/12 4/679 |

* cited by examiner

*Primary Examiner* — Schyler S Sanks
(74) *Attorney, Agent, or Firm* — Polsinelli PC

(57) ABSTRACT

Various embodiments of a reverse thermostat for use in restricting hot water in a plumbing system from being delivered to cold water fixtures are disclosed.

12 Claims, 3 Drawing Sheets

# SYSTEMS AND METHODS FOR A REVERSE THERMOSTAT

CROSS REFERENCE TO RELATED APPLICATIONS

This is a non-provisional application that claims benefit to U.S. provisional application Ser. No. 62/713,743 filed on Aug. 23, 2018, which is herein incorporated by reference in its entirety.

FIELD

The present disclosure generally relates to a plumbing system that restricts access to hot water, and in particular, to a plumbing system having a "reverse thermostat" that allows cold water to pass into plumbing fixtures intended for cold water access while restricting the flow of hot water, thereby allowing plumbing fixtures that require hot water to immediately access hot water.

BACKGROUND

Conventional plumbing thermostats are designed to allow water that is above 100° F. in temperature to be released to a plumbing fixture, such as a faucet, in order to maintain a constant operating temperature of the water throughout the plumbing system. However, prior to accessing hot water from a hot water fixture an excessive amount of cold water is stored in the plumbing line is wasted before the hot water arrives at the plumbing fixture.

It is with these observations in mind, among others, that various aspects of the present disclosure were conceived and developed.

DETAILED DESCRIPTION

Figure 1:
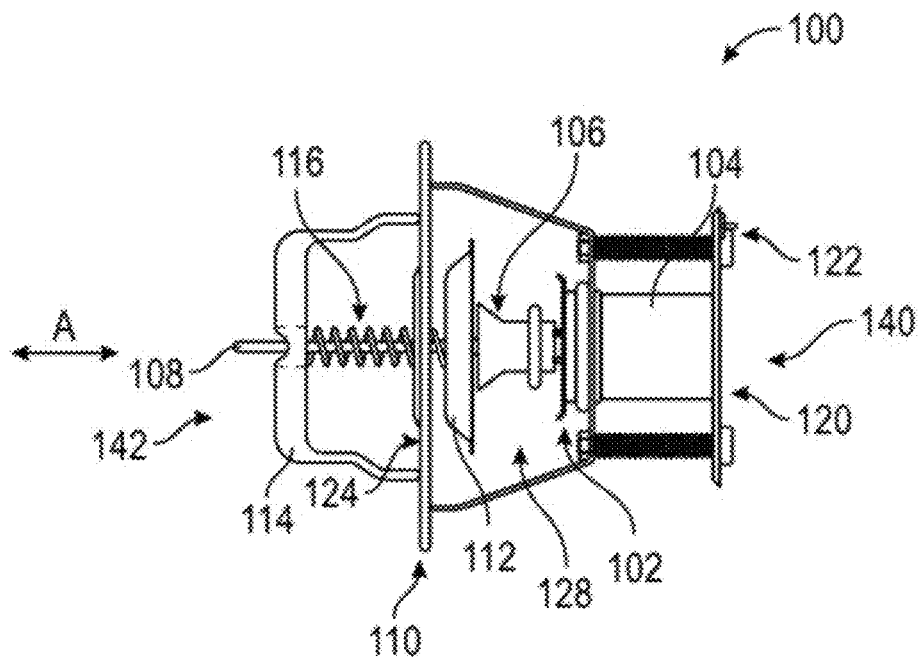
FIG. 1 is a simplified illustration of one embodiment of a reverse thermostat.

Various embodiments of a reverse thermostat for use in allowing cold water in a plumbing system to flow out of a hot water line and be delivered to cold water fixtures are disclosed. In particular, the reverse thermostat includes a heat sensitive wax expansion element that remains solid in the presence of cold water such that water at a predetermined temperature, for example below 80° F., from a hot water supply line is re-directed through a flow control gate towards a cold water plumbing fixture within the plumbing system, where a heat sensitive wax expansion element transforms from a solid state to a liquid state in the presence of hot water above 80° F., thereby closing the flow control gate such that hot water is maintained in close proximity to a hot water plumbing fixture. Referring to the drawings, an embodiment of a reverse thermostat operable for use in a plumbing system 10 is illustrated and generally indicated as 100 in FIGS. 1-4.

Figure 2:
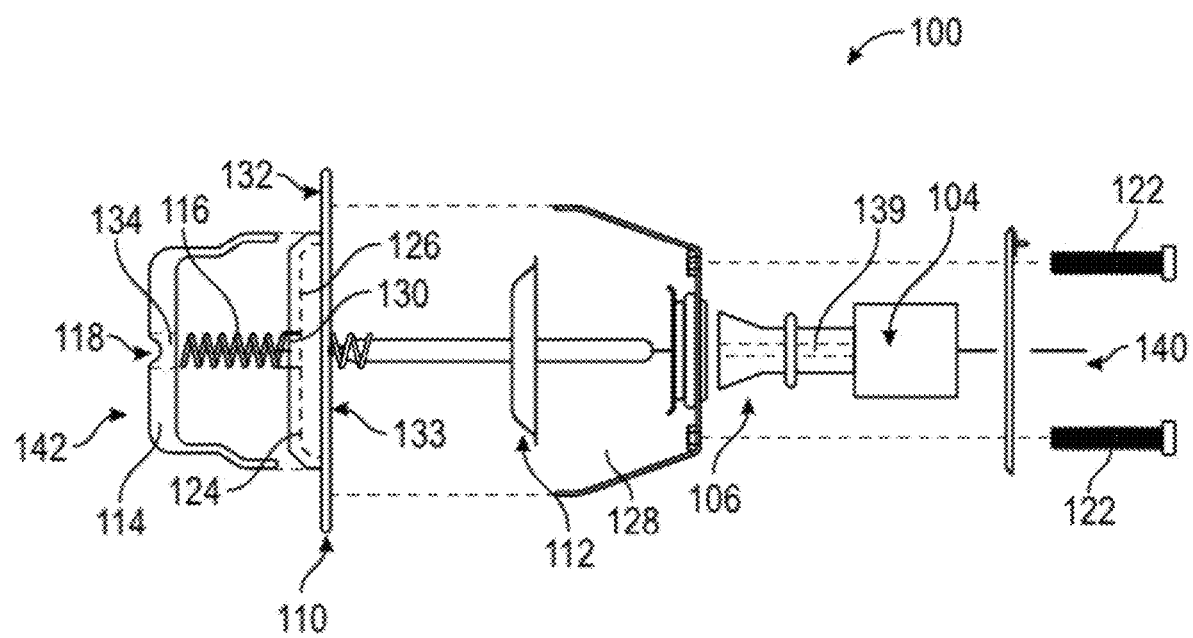
FIG. 2 is an exploded view of the reverse thermostat of FIG. 1.

As shown in FIGS. 1 and 2, in some embodiments the reverse thermostat 100 is operable to only permit water in the plumbing system 10 that is at a predetermined temperature, such as 80° F. or less, to be delivered to a plumbing fixture, such as the toilet 12 or faucet 34 (FIGS. 3 and 4) while restricting the movement of hot water, thereby keeping hot water in a hot water supply line 18 near a hot water plumbing fixture such as a faucet 34. In some embodiments, the reverse thermostat 100 may include a reservoir support housing 102 engaged to a gate seat support housing 110 that encases a gate rod 108 coupled to a flow control gate 112 within a cavity 128 (FIG. 1) collectively defined by the gate seat 124 and the gate seat support housing 110. In some embodiments, the gate rod 108 is inserted through a center aperture 130 of the gate seat support housing 110 and oriented substantially in perpendicular relation to the gate rod 108 that extends along the longitudinal axis A of the reverse thermostat 100. As further shown in FIG. 1, the gate rod 108 also extends through an axial opening 134 formed through the gate rod support housing 114 such that the gate rod 108 extends outwardly from the reverse thermostat 100 along longitudinal axis A. In one arrangement, the flow control gate 112 is configured to substantially extend across the cavity 128 so as to control the flow of liquid through the cavity 128, such that the flow control gate 112 closes in the presence of hot water and opens in the presence of cold water, thereby preventing hot water from flowing through the reverse thermostat 100 and allowing cold water to flow through the reverse thermostat 100.

As shown, the reservoir support housing 102 is coupled to a hollow reservoir cylinder 106 that defines a reservoir cylinder channel 139 and extends axially into the cavity 128 of the reservoir support housing 102. Referring specifically to FIG. 2, the reservoir cylinder 106 is coupled to or integral with a reservoir 104. In some embodiments, the reservoir 104 is configured to store a heat sensitive wax expansion element, such as a wax pellet or other type of heat sensitive wax expansion element. The heat sensitive wax expansion element is in a solid state at low temperatures (e.g., temperature of 80° F. or less), and as the water heats up over, for example 80° F., the heat sensitive wax expansion element melts into a liquid state and expands. As such, heating and expansion causes the heat sensitive wax expansion element to melt and flow through the reservoir cylinder channel 139 of the reservoir cylinder 106 as shall be described in greater detail below.

In some embodiments, water may enter at a proximal end 140 of the reverse thermostat 100 and surround the reservoir 104 such that the heat sensitive wax expansion element is surrounded by the water, thereby transferring heat between the heat sensitive wax expansion element and the water held behind a proximal side 133 of the gate seat support housing. Water may exit through a distal end 142 of the reverse thermostat 100 after being released through the flow control gate 114.

In some embodiments, the gate seat 124 is formed along a distal side 132 of the gate seat support housing 110 opposite the proximal side 133 of the gate seat support housing 110, which communicates with the cavity 128. The gate seat 124 is encased within a gate rod support housing 114 and defines a recess 126 in communication with a central opening 130 configured to allow the gate rod 108 to extend through the gate seat support housing 110 such that the flow control gate 114 is operable to be coupled with the gate seat 124 and create a seal when closed, thereby restricting the flow of hot water out of the reverse thermostat 100. As noted above, the gate rod support housing 114 forms an axial opening 134 defining a gate rod guide 118 configured to allow the gate rod 108 to extend outwardly from the gate rod support housing 114. As shown, the portion of the gate rod 108 disposed within the gate rod support housing 114 is engaged to a return spring 116 that provides a biasing force to the flow control gate 112 and to allow the flow control gate 112 to snap back open when the heat sensitive wax expansion element is in a solid state, thereby allowing the flow of cold water out of the reverse thermostat 100. In addition, in some embodiments, the reverse thermostat 100 may include an adjustable water flow control plate 120 that may be secured to the reservoir support housing 102 by a plurality of screws 122 for manually adjusting the flow of water into the reverse thermostat 100.

In one mode of operation, in some embodiments the heat sensitive wax expansion element residing within the reservoir 104 of the reverse thermostat 100 will begin to expand when exposed to water heated to above 80° F. in the plumbing system 10 such that the heat sensitive wax expansion element transitions from a solid state to a liquid state as it expands and then flows through the reservoir cylinder channel 139 of the reservoir cylinder 106 from the reservoir 104 until the heat sensitive wax expansion element contacts the flow control gate 112. When the heat sensitive wax expansion element expands and contacts the flow control gate 112, the flow control gate 112 is forced in a direction towards the gate seat support housing 110 such that the gate rod 108 extends further outward from the gate rod support housing 114. This movement of the gate rod 108 and flow control gate 112, when the heat sensitive wax expansion element is caused to expand, restricts the flow of hot water out of the flow control gate 112 of the reverse thermostat 100.

Figure 3:
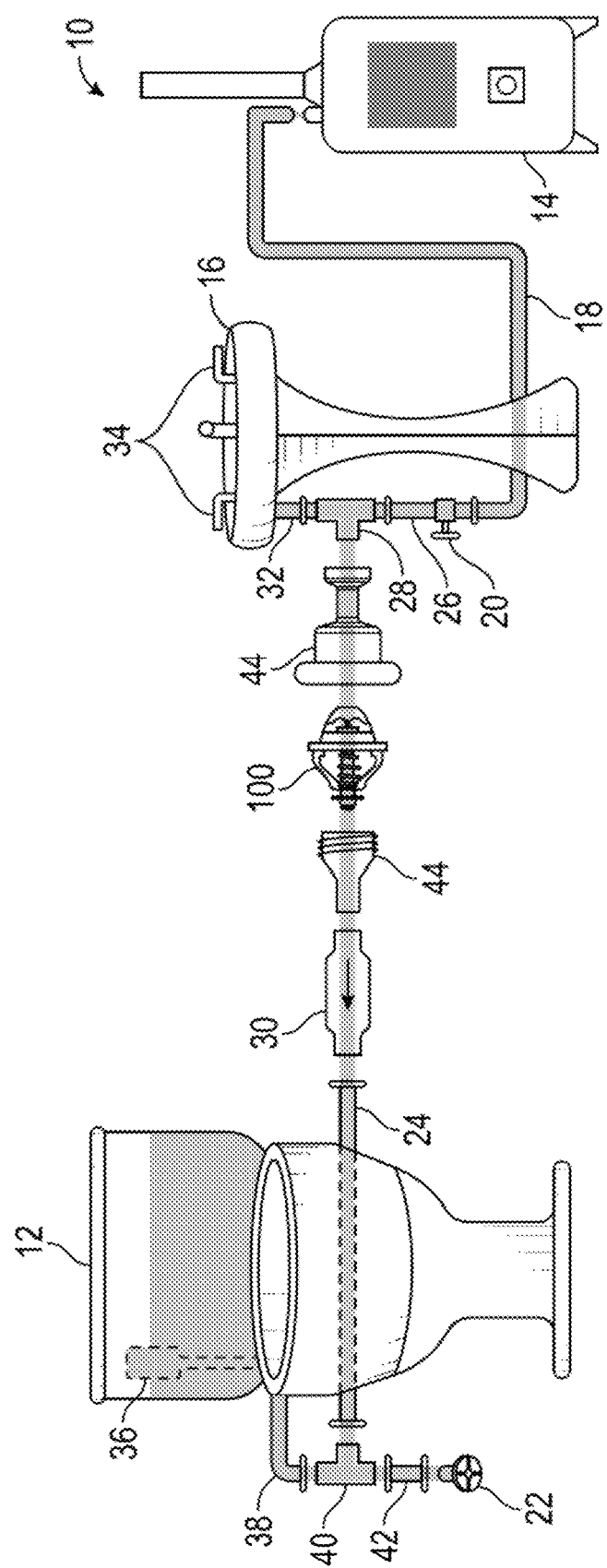
FIG. 3 is an illustration of a plumbing system having the reverse thermostat of FIG. 1 shown in a pre-flush condition, where hot water is indicated in red, warm water is indicated in pink, lukewarm water is indicated in yellow and cold water is indicated in blue.

As shown in FIG. 3, the reverse thermostat 100 allows cold water (e.g., water having a temperature of 80° F. or below) from a hot water supply line 18 of a hot water heater 14 to be utilized within the plumbing system 10 by re-directing the cold water through the reverse thermostat 100 to a plumbing fixture, such as toilet 12 or sink 16, while restricting the flow of hot water (e.g., water having a temperature above 80° F.) from the hot water supply line 18 of a hot water heater 14 to be utilized within the plumbing system 10. In this manner, the reverse thermostat 100 essentially removes cooled water from a hot water line and recycling it to plumbing fixtures which would utilize cold water, such as the toilet 12 or faucet 34.

In some embodiments, elements of the reverse thermostat 100 may be crafted using common water supply line materials such as (but not limited to) galvanized iron or copper. The reverse thermostat 100 may also be treated with an anti-microbial agent to prevent biofilm buildup in the plumbing system 10 and contamination of water.

In other embodiments, the reverse thermostat 100 may act to restrict the flow of water to plumbing fixtures at other predetermined temperatures by changing the specific composition of the heat sensitive wax expansion element. For example, the reverse thermostat 100 may restrict or prevent the flow of water at temperature ranges between 75° F. to 90° F., although other temperature ranges are contemplated by the present disclosure.

Figure 4:
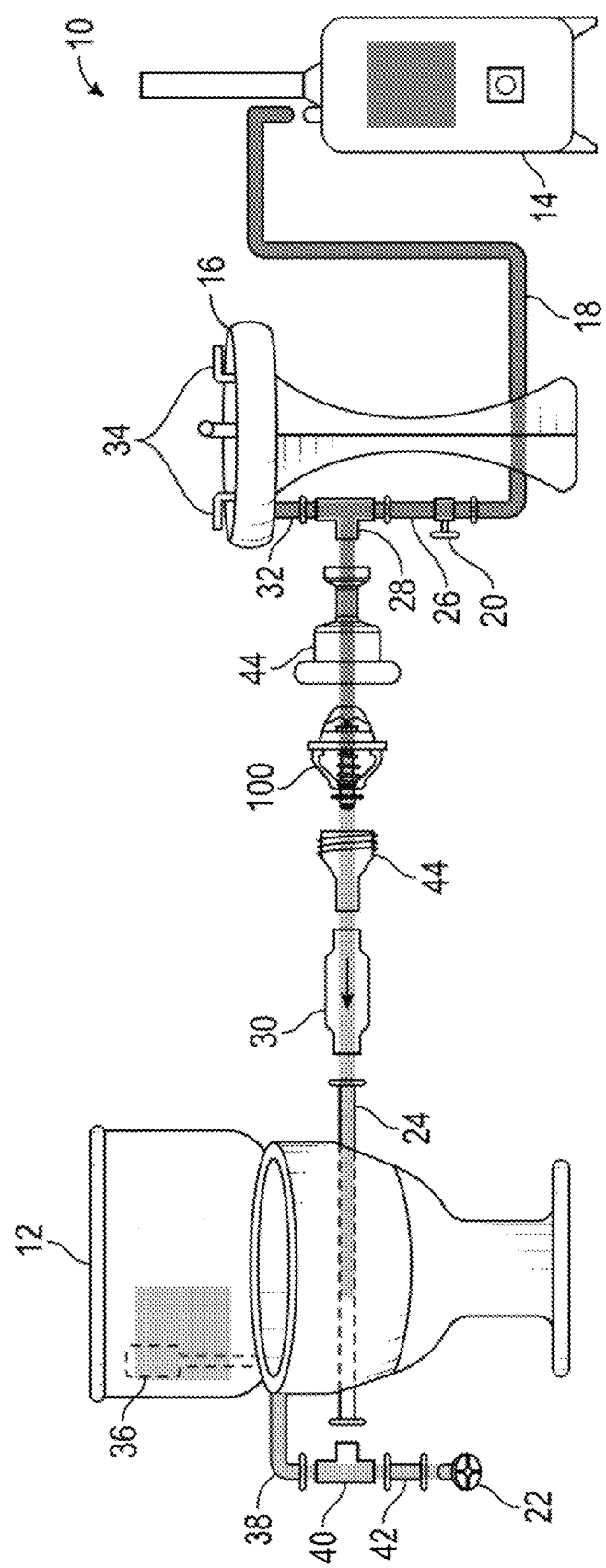
FIG. 4 is an illustration of the plumbing system of FIG. 3 shown in a post-flush condition where hot water is indicated in red, warm water is indicated in pink, lukewarm water is indicated in yellow and cold water is indicated in blue Corresponding reference characters indicate corresponding elements among the view of the drawings. The headings used in the figures do not limit the scope of the claims.

As shown in FIGS. 3 and 4, a typical plumbing system 10 that incorporates a reverse thermostat 100 is shown. In some embodiments, the plumbing system 10 may include a hot water heater 14 that is operable for heating water to above a predetermined temperature. The hot water heater 14 is in fluid flow communication with a water line 18 that is coupled to a sink 16. In some embodiments, the water line 14 may be coupled to the sink 16 through a water hose 26 in series with a plumbing T component 28 for delivering hot water to the faucet 34.

As shown, the plumbing T component 28 may be connected to one of a pair of quick connect couplers 44 that encase the reverse thermostat 100 and is engaged between the plumbing T component 28 and a one way check valve 30, which prevents backflow of cooled water from propagating through the plumbing system 10. The plumbing T component 28 is connected at the proximal end 140 of the reverse thermostat 100 by one of a pair of quick connect couplers 44 and the distal end 142 of the reverse thermostat 100 is connected to the one-way check valve 30 by one of a pair of quick connect couplers 44. In this arrangement, the hot water from the hot water heater 14 is delivered directly to the faucet 34 of the sink 16, while hot water exceeding 80° F. is prevented from being delivered to the toilet 12 due to the closure of the flow control gate 112 of the reverse thermostat 100, as per operation of the reverse thermostat 100. Conversely, water at a temperature of 80° F. or below is allowed to pass through the reverse thermostat 100 due to the opening of the flow control gate 112 and flow to the toilet 12.

As further shown, a water hose 24 fluidly couples the one-way check valve 30 with the toilet 12. In some embodiments, a plumbing T component 40 is in fluid flow communication with the water hose 24 and is coupled between a water hose 42 that leads to a cold water valve 22 for controlling the flow of cold water to the toilet 12 and a water hose 38 that is in fluid flow communication with a toilet tank float 36 residing in the toilet 12 for flushing operations. Although the above description the plumbing system 10 provides an exemplary example, other types and arrangements of plumbing components may be used for the plumbing system 10.

Referring specifically to FIGS. 3 and 4, one method of using the reverse thermostat 100 with the plumbing system 10 during operation of the toilet 12 will be described. As shown in FIG. 3, cold water will usually reside within the plumbing system 10 prior to the toilet 12 being flushed. As shown in FIG. 4, after the toilet 12 is flushed, the reverse thermostat 100 will only allow water from the hot water heater 14 that is at a temperature of 80° F. or below to flow and refill the toilet 12 after flushing.

In one aspect, the reverse thermostat 100 used with plumbing system 10 as disclosed herein prevents hot water from accidently being diverted to a cold water line. As such, the reverse thermostat 100 allows temporary access to the cold water line of the plumbing system 10 by mechanically preventing any hot water from accessing the cold water line, while ensuring that only hot water is stored in the hot water line.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for re-directing cool water from hot water lines using a reverse thermostat apparatus, the system comprising:
 a hot water source, wherein the hot water source is operable to dispense hot water into a hot water supply line, wherein the hot water source is operable to heat the water to a temperature above a predetermined temperature;
 a reverse thermostat apparatus having a proximal end, a distal end, and a flow control gate positioned between the proximal end and the distal end and controlled by a heat-sensitive expansion element, wherein the heat-sensitive expansion element is operable to expand when exposed to a temperature above the predetermined temperature and contract when exposed to a temperature below the predetermined temperature such that:
  expansion of the heat-sensitive expansion element drives the flow control gate into a closed position when hot water is present at the expansion element such that water is prevented from flowing from the first orifice to the second orifice when the flow control gate is in the closed position; and
  contraction of the heat-sensitive expansion element drives the flow control gate into an open position when cold water is present at the expansion element such that water is allowed to flow from the first orifice to the second orifice when the flow control gate is in the open position;
 wherein water from the hot water supply line flows into the reverse thermostat apparatus from the proximal end and wherein water flows out of the distal end of the reverse thermostat apparatus if the flow control gate is in the open position; and
 wherein the distal end of the reverse thermostat apparatus is in fluid flow communication with a first orifice of a plumbing T component;
 a cold water line in fluid flow communication with a second orifice of the plumbing T component and operable to dispense cold water to the second orifice of the plumbing T component; and
 a cold water plumbing fixture in fluid flow communication with a third orifice of the plumbing T component and operable to receive water from the third orifice of the plumbing T component;
 wherein the plumbing T component combines water exiting the second orifice of the reverse thermostat apparatus with cold water from the cold water line such that water from the second orifice of the reverse thermostat apparatus and water from the cold water line collectively exit the third orifice of the plumbing T component and collectively enter the cold water fixture.

2. The system of claim 1, further comprising:
 a hot water plumbing fixture situated between the hot water source and the proximal end of the reverse thermostat apparatus, wherein the hot water supply line connects to the hot water plumbing fixture and the proximal end of the reverse thermostat apparatus.

3. The system of claim 1, further comprising:
 a one-way check valve in fluid flow communication with the distal end of the reverse thermostat and the cold water plumbing fixture, wherein the one-way check valve prevents backflow of cold water from the cold water line into the distal end of the reverse thermostat.

4. The system of claim 1, wherein the cold water plumbing fixture comprises a toilet tank and wherein the toilet tank comprises a float valve, wherein the float valve prevents water from the cold water line from flowing into the toilet tank when an amount of water in the toilet tank is at maximum capacity.

5. The system of claim 4, wherein the water in the cold water line is allowed to flow into the toilet tank when the amount of water in the toilet tank is below maximum capacity.

6. The system of claim 1, wherein the reverse thermostat apparatus couples with the hot water line and a water hose in communication with the first orifice of the plumbing T component using quick connect couplers.

7. The system of claim 1, wherein the reverse thermostat apparatus includes:
 a gate seat interposed between a reservoir support housing and a gate rod support housing, wherein the reservoir support housing is coupled to the gate rod support housing;
 a gate rod that extends through the gate seat and extends outwardly from the gate rod support housing, the gate rod being coupled to a flow control gate for controlling the flow of water through the reverse thermostat; and
 a reservoir engaged to the reservoir support housing and in fluid flow communication with a reservoir cylinder, wherein the heat sensitive expansion element is positioned within the reservoir.

8. The system of claim 7, the reverse thermostat apparatus further comprising:
 a return spring coupled to the gate rod for applying a bias to the flow control gate.

9. The system of claim 7, wherein the gate seat defines a recess in communication with a central opening that is configured to receive the flow control gate for selectively controlling or terminating the flow of water through the reverse thermostat apparatus.

10. The system of claim 7, further comprising an adjustable flow control plate for manually adjusting fluid flow through the reverse thermostat apparatus.

11. The system of claim 7, wherein the reverse thermostat apparatus is comprised of galvanized iron or copper, and wherein the reverse thermostat apparatus is treated with an antimicrobial agent.

12. The system of claim 7, wherein the predetermined temperature is determined by the chemical makeup of the heat-sensitive expansion element.

* * * * *